United States Patent

[11] 3,609,408

[72] Inventors Lewis Rand Motisher
Canoga Park;
Emil Engel, Los Angeles, both of Calif.

[21] Appl. No. 862,207
[22] Filed Sept. 30, 1969
[45] Patented Sept. 28, 1971
[73] Assignee RCA Corporation

[54] CLOCK PULSE GENERATOR
4 Claims, 6 Drawing Figs.

[52] U.S. Cl. .......... 307/269,
328/113, 328/133, 331/1, 331/12, 331/17, 331/36
[51] Int. Cl. .......... H03k 17/00
[50] Field of Search .......... 307/232,
269; 328/133, 113; 331/1, 12, 16, 17, 26, 28, 36

[56] References Cited
UNITED STATES PATENTS

| | | | |
|---|---|---|---|
| 2,702,852 | 2/1955 | Briggs | 331/12 X |
| 2,904,685 | 9/1959 | Salmet | 331/1 X |
| 3,010,073 | 11/1961 | Melas | 331/1 |
| 3,139,593 | 6/1964 | Kaminski et al. | 331/36 X |
| 3,290,618 | 12/1966 | Leysieffer | 331/36 X |
| 3,487,461 | 12/1969 | Lynn | 331/17 X |

*Primary Examiner*—Donald D. Forrer
*Assistant Examiner*—R. C. Woodbridge
*Attorney*—H. Christoffersen

ABSTRACT: Signals such as pulses derived from binary data signals are employed to excite a tuned circuit. When the frequency *nf* to which the tuned circuit is tuned differs from *n* times the actual frequency *f'* of the binary data signals, a control signal is produced which is employed to tune the tuned circuit in a sense and amount to reduce the control signal to zero. Clocking signals synchronous with the binary data signals may be derived from the tuned circuit.

INVENTORS
LEWIS R. MOTISHER &
EMIL ENGEL
BY Samuel Cohen
Attorney

INVENTORS
LEWIS R. MOTISHER &
EMIL ENGEL
BY
Attorney

INVENTORS
LEWIS R. MOTISHER &
EMIL ENGEL
BY Samuel [signature]
Attorney

CLOCK PULSE GENERATOR

BACKGROUND OF THE INVENTION

The invention described in this application was made in the course of a subcontract for the Department of the Army.

In the operation of systems for the storage and retrieval of binary data, it is often necessary to produce a timing signal, known as a clock pulse, each time a binary information signal is "read" from the system's recording medium. One way this may be done in drum, magnetic tape, magnetic disc or the like systems, is to record clock pulses on a separate clock track on the recording medium at the same time the information is recorded on the remaining tracks on the medium. As the clock track is on the same medium as and therefore moves at the same speed as the information tracks, the clock signals produced by the clock track during the read operation remain synchronous with the signals read from the information tracks, regardless of any variation in the speed at which the recording medium is driven.

In modern high density recording systems, it is preferred not to have to use any additional space on the recording medium for a clock track. It is therefore necessary, in systems of this type, separately to derive the clock signals from the binary information signals. Here too, a number of different solutions are available. In one suggested in U.S. Pat. No. 3,010,073 to Melas, issued Nov. 21, 1969, signals produced by an astable multivibrator are compared in frequency with the binary data signals. When the two frequencies differ, the multivibrator frequency is changed in a sense to reduce the difference to zero. The multivibrator operating frequency is also compared to the frequency to which a passive reference — a fixed-tuned resonant circuit, is tuned. Any change in the multivibrator frequency results in a phase error and a control signal produced in response to this phase error is employed to tune the multivibrator back to the frequency of the tuned circuit. The signals produced by the multivibrator may be employed to produce the clock pulses.

The proper operation of the system above requires that the tuned circuit be at the same average frequency as the binary data signals. With any difference between the fixed tuned circuit frequency and the input data frequency, the control signal holds the multivibrator to the tuned circuit frequency and away from the data frequency. Of course, this is highly disadvantageous.

The object of the present invention is to provide a new and improved system for producing clock signals which are synchronous with binary information signals.

SUMMARY OF THE INVENTION

Apparatus embodying the invention includes a source of binary signals of nominal frequency $f$, where $f$ is subject to drift, and a tuned circuit tuned to frequency $nf$, where $n$ is an integer. Means responsive to the source applies a signal to the tuned circuit for exciting the same and a signal to a phase detector. A signal derived from the tuned circuit is also applied to the phase detector for causing the latter to produce a control signal when the frequency to which the tuned circuit is tuned differs from $n$ times the actual frequency of the binary signals. In response to this control signal, the tuned circuit is tuned in a sense to reduce the control signal to zero.

DETAILED DESCRIPTION

Figure 1:
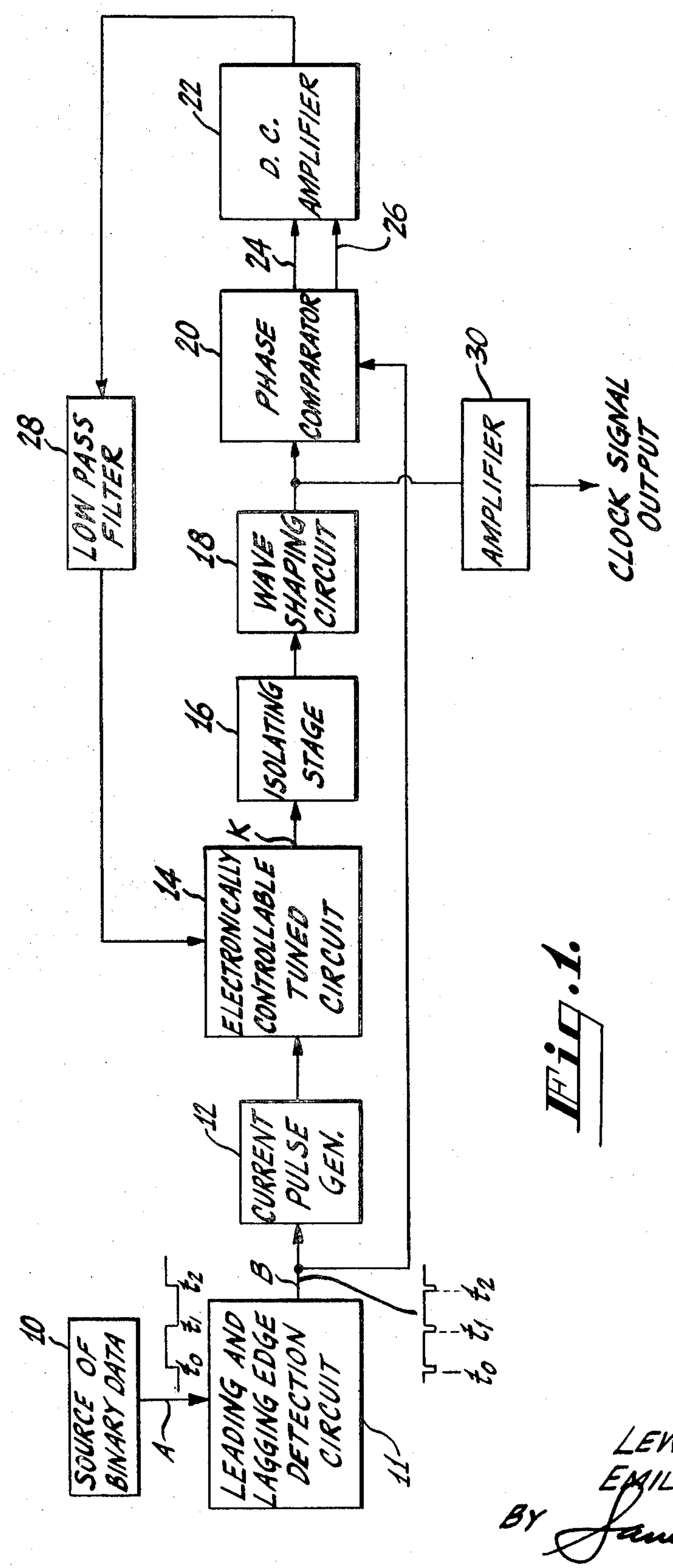
FIG. 1 is a block diagram of a system embodying the invention.

The system of FIG. 1 includes a source 10 of binary data which may be a drum, magnetic tape, magnetic disc, card system or the like. The data signal A produced by the source 10 is one of the type in which each level change represents a change in the value of the recorded binary information. The code employed, for example, may be Manchester code or delay code or the like.

The signal A produced by source 10 is applied to the leading and lagging edge detection circuit 11. Its function is to produce a pulse of the same amplitude and polarity each time there is a transition in the wave A. Any one of a number of circuits may be employed as, for example, a differentiator followed by means for amplifying the pulses of one polarity and inverting and amplifying the pulses of other polarity and for combining the two groups of pulses thereby produced. Other conventional, alternative means may be employed instead.

The pulses B produced by circuit 11 are applied to a current pulse generator 12 whose function is to produce current pulses at a suitable power level to excite the tuned circuit 14. As will be shown shortly, circuit 14 is a parallel resonant circuit and includes electronically controllable reactive elements as, for example, varactor diodes. The oscillations K produced by the tuned circuit 14 are applied through an isolating circuit 16, such as an emitter follower, to a wave-shaping circuit 18, such as a Schmitt trigger. The function of the latter is to translate the oscillations produced by the tuned circuit to a fixed amplitude square wave of the same frequency as these oscillations.

The square wave produced at 18 and the input pulses at B serve as inputs to phase comparator 20. The latter produces outputs which are applied to the direct current (DC) amplifier 22 via leads 24 and 26. In response to these outputs, the DC amplifier applies a control signal, via low-pass filter 28, to the electronically controllable elements of the tuned circuit 14. The sense of the control signal is such as to tune the tuned circuit in a direction and amount to reduce the control signal to zero. The function of the control signal, in other words is to tune the tuned circuit 14 to a frequency $nf$ where $n$ is some integer and $f$ is the actual value of the binary data signal frequency. The clock pulses may be derived from the trigger circuit 18 by means of amplifier 30.

An important feature of the present circuit as contrasted, for example, to the circuit of the Melas patent is that there is no internal source of periodic signal — no separate oscillator, multivibrator or the like. As already mentioned, with the previous arrangement, when there is a difference between the frequency to which the resonant passive reference circuit is tuned and the input data frequency, the control voltage developed tends to pull the multivibrator or other oscillator towards the reference frequency and away from the data frequency. In the present arrangement, the binary data frequency is employed as the reference and the tuned circuit 14 (from which the clock signals are derived via stages 16, 18 and 30) always "tracks" the data frequency, that is, always is tuned to a frequency synchronous with the data frequency. The tuned circuit 14 may be tuned to the same frequency as the binary data source or to a harmonic thereof such as the second or fourth harmonic.

Figure 2:
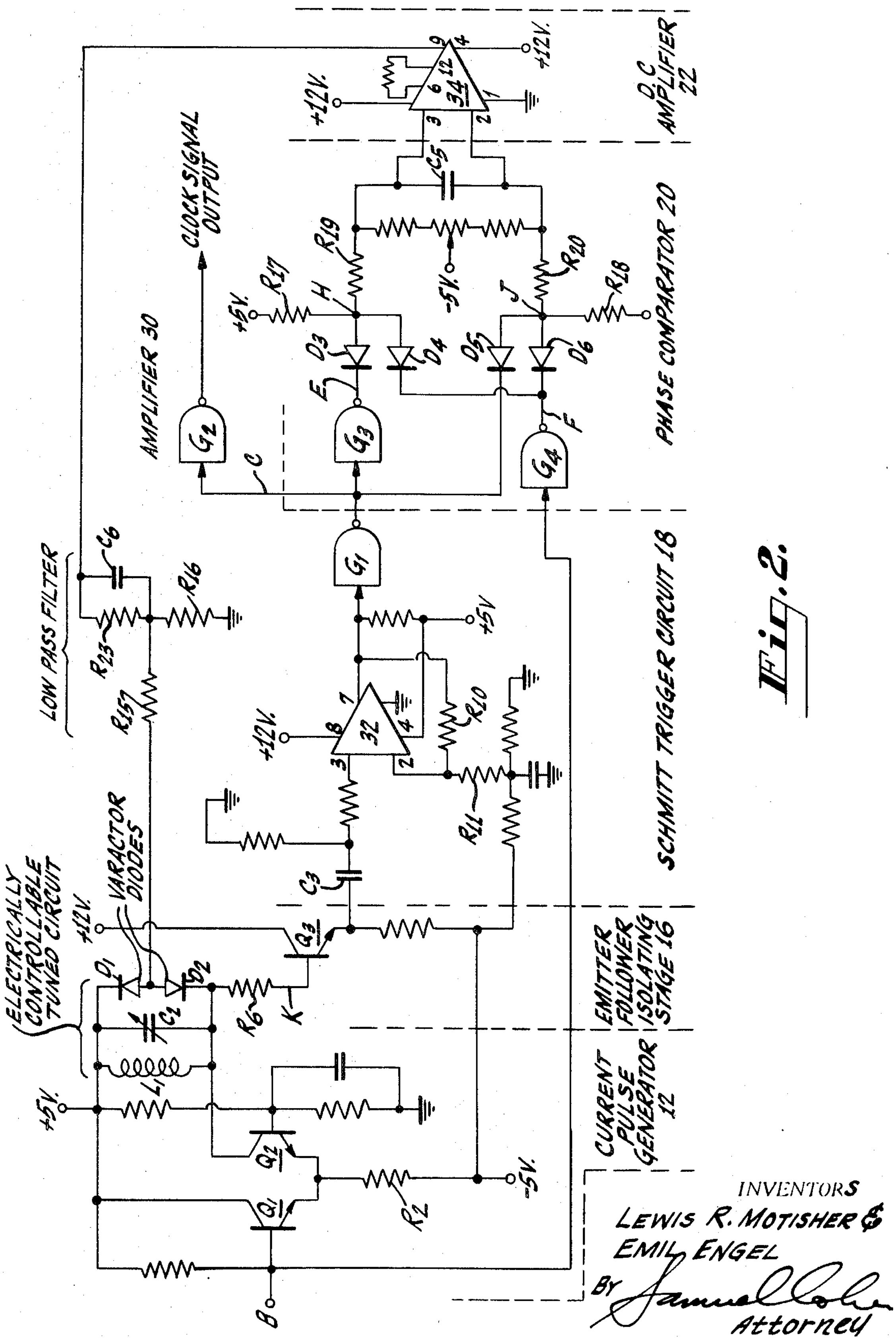
FIG. 2 is a circuit diagram of a portion of the system of FIG. 1.

With the circuit arranged as shown in FIGS. 1 and 2, any frequency drift of the binary data signal A, or any change in the natural resonant frequency of the electronically controllable passive reference circuit, namely tuned circuit 14, causes a direct control voltage to develop for retuning the tuned circuit 14 to a frequency synchronous with the binary data frequency at A. In other words, in the present system, the tuned circuit 14 is directly controlled by the input data frequency and thus the clock signals produced also are directly controlled by and follow any changes in this data frequency.

The Q of the reference circuit 14 determines the "pull-in" time of the system, that is, it determines the time required for the clock signal produced by amplifier 30 to become synchronous with the data signal A and determines also the amount of jitter in the input data that is removed from the clock signal. The time constant of the low-pass filter 28 in the feedback loop determines the rate of frequency variation in the binary data signal that the circuit will follow. Both of these parameters are independently controllable. These characteristics are decided advantages in drum, disc, tape and similar memory systems where the recording memory driving speed and correspondingly the data frequency is not necessarily closely controlled. They are also advantageous in systems in which the data source is remote. Here, the need tightly to control the data frequency in order to eliminate "declocking" problems at a remote receiver is greatly reduced.

The portion of the system of FIG. 1 starting with the current pulse generator 12 is shown in detail in FIG. 2. The current pulse generator 12 includes two NPN transistors $Q_1$ and $Q_2$ connected at their emitters to a common emitter resistor $R_2$. The resonant circuit $L_1$, $C_2$, $D_1$, $D_2$ is connected between the collectors of the two transistors $Q_1$ and $Q_2$. As indicated by the legend, the diodes $D_1$ and $D_2$ are varactor diodes and, as well understood in this art, the capacitance they exhibit is a function of the voltage across these diodes.

The oscillations produced by the tuned circuit are applied via resistor $R_6$ to the base of transistor $Q_3$. The latter is connected as an emitter-follower and serves to isolate the tuned circuit from the Schmitt trigger circuit 18 which follows.

The Schmitt trigger circuit comprises an integrated circuit 32 which may, for example, be Model No. U710, manufactured by Fairchild Semiconductor, and feedback resistors $R_{10}$ and $R_{11}$. The numbers 2, 3, 4 and so on shown, are the actual pin numbers for this circuit. The output at terminal 7 of circuit 32 is applied to an inverter gate $G_1$ whose function is to increase the power level of the output signal to a point sufficient to "fan out" to the stages it drives.

The phase comparator 20 which receives the pulses B at inverter $G_4$ and the pulses C produced by the Schmitt trigger circuit at inverter $G_3$ includes a first diode AND gate $D_3$ $D_4$ and a second diode AND gate $D_5$ $D_6$. The output signals H and J developed at these AND gates are applied through resistors $R_{19}$ and $R_{20}$, respectively to the two input terminals 2 and 3 of the integrated circuit, direct current differential amplifier 34. The latter may be model No. CA3015 manufactured by RCA Corporation. The output terminal 9 of the amplifier is connected via low-pass filter network $R_{23}$, $C_6$, $R_{16}$ and $R_{15}$ to the varactor diodes of the tuned circuit 14.

In the discussion of the operation of the circuit of FIG. 2 which follows, both this circuit and FIGS. 3—6 should be referred to. The pulses B derived from the binary data signal A are a series of narrow (50-nanosecond duration) pulses. These narrow pulses are employed rather then the data signals to increase the harmonic content of the signals applied to drive the tuned circuit 14. The tuned circuit 14, in the present example, is tuned to approximately double the frequency of the pulses B. The tuned circuit 14 represents a band-pass filter to the signal B and any mistuning due either to changes in any of the parameters of the tuned circuit or to drift in the data frequency, results in a phase shift and a loss in amplitude of the output signals produced by the tuned circuit.

Figure 3:
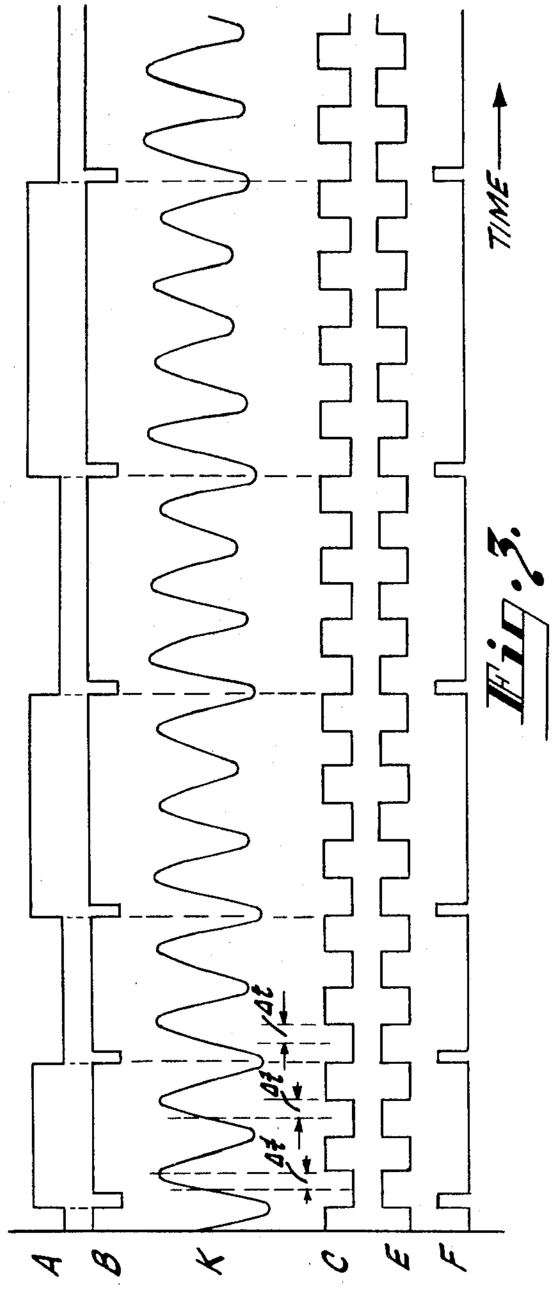

Each time a negative pulse B is produced, the transistor $Q_1$ turns off and a 1.6 milliamperes 50-nanosecond-current pulse is applied to the tank circuit. With the data rate assumed to be 2 megahertz (MHz.), the tuned circuit 14 may be tuned to 4 MHz. The tuned circuit passes the 4 MHz. component in the pulse stream and a 7 to 10 volt peak-to-peak sine wave signal is produced. This signal K is shown in FIG. 3. Note that it is not uniform either in frequency or amplitude, indicating some drift in the data signal repetition frequency.

An emitter-follower $Q_3$ isolates the tuned circuit 14 from the Schmitt trigger circuit 18 to reduce the loading effect of the Schmitt trigger circuit and thereby to maintain the Q of the tuned circuit relatively high.

The threshold of the Schmitt trigger may be set at ±0.25 volts. The finite rise time of the input wave and this threshold produces a desired delay in the output. This delay plus the delay in the emitter-follower and the output gate $G_1$ is $\Delta t$ (shown in FIG. 3). Its value is approximately one-quarter of a cycle. The nominal timing as shown in FIG. 3 is as follows. The center of pulse B is time coincident with the center of the negative peak of K when the tank circuit frequency and data frequency are the same. These signals shift with respect to each other as either frequency changes. Signals C and E are shifted by the amount $\Delta t$ and are one-quarter of a cycle delayed from K. Signal F is time coincident with B.

The gate $G_1$, for purposes of the present discussion shown to be included within the Schmitt trigger circuit, produces the output pulses C. These pulses are inverted by gate $G_3$ to produce the pulses E. The pulses C serve as one input to AND gate $D_5$ $D_6$ and the pulses E serve as one input to AND gate $D_3$ $D_4$. The second input to both AND gates is the pulses F derived from the pulses B. During the time diodes $D_3$ and $D_4$ are both cut off, that is, during the period the positive pulse E is concurrent with the positive pulse F, the 5-volt source connected through resistors $R_{17}$ and $R_{19}$ to capacitor $C_5$ charges the upper plate of capacitor $C_5$ relatively positive. In similar fashion, the pulses C are compared with pulses F by AND gate $D_5$ $D_6$. During the period these pulses are positive at the same time, that is, during the time both diodes $D_5$ and $D_6$ are cut off, the +5-volt source charges the lower plate of capacitor $C_5$ through resistors $R_{18}$ and $R_{20}$.

Figure 6:
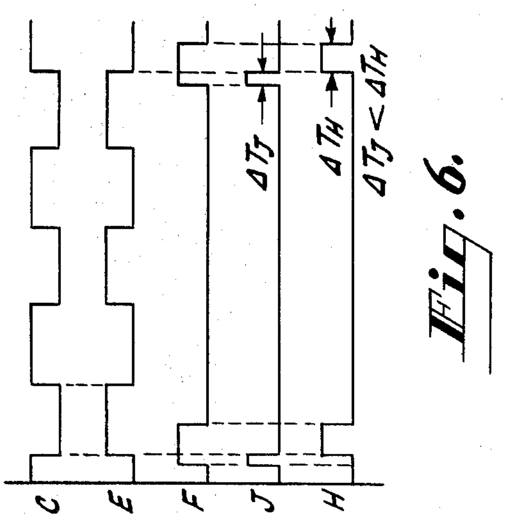
FIGS. 3–6 are drawings of waveforms to help explain the operation of the system embodying the invention.
Figure 5:
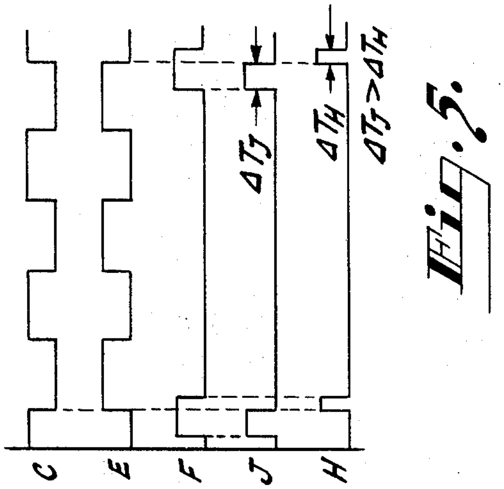
Figure 4:
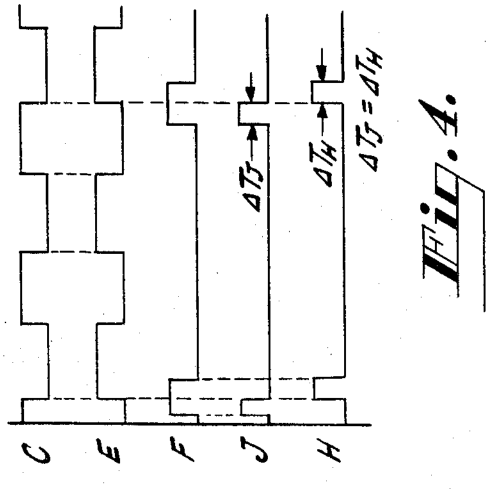

The operation of the arrangement is illustrated most clearly in FIGS. 4, 5 and 6 which are views of the waves C, E, F, J and H in expanded time scale. FIG. 4 illustrates the circuit condition when the tuned circuit is tuned to exactly double the frequency of the pulses B. Under this set of conditions, the leading edge of the wave E occurs at the exact center of the pulse F as does the lagging edge of the wave C. Therefore, the pulses J and H are of the same duration ($\Delta T_J=\Delta T_H$) and the capacitor $C_5$ at the input circuit to the DC amplifier is charged positively to the same extent at both plates (no difference in voltage exists between these plates). The result is that the amplifier 34 produces an output control signal equal to zero and the resonant frequency of tuned circuit 14 remains unchanged.

The condition shown in FIG. 5 is one in which the data frequency is relatively too high. Under this set of conditions, the lagging edge of wave C and the leading edge of wave E occur at a time later than that at which the center of the pulse F occurs. This causes the positive pulses J produced by AND gate $D_5$ $D_6$ to have a duration greater than the positive pulses H produced by AND gate $D_3$ $D_4$ ($\Delta T_J>\Delta T_H$). The result is the development of a voltage of one sense across the capacitor, that is, one in which the lower plate is more positive than the upper plate. This causes the DC amplifier 22 to produce a control voltage in a sense to reduce the capacitance introduced by the varactor diodes and thereby to increase the frequency to which the tuned circuit is tuned. The tuning continues until the tuned circuit frequency increases sufficiently to become equal to exactly double the frequency of the pulses B at which time the control voltage reduces to zero.

Fig. 6 illustrates the condition in which the input signal frequency is relatively too low. When this occurs, the duration of the positive pulses H is greater than that of the positive pulses J ($\Delta T_H>\Delta T_J$) and a voltage develops across the capacitor $C_5$ of the opposite sense, that is, the upper plate of the capacitor becomes relatively more positive than the lower plate. The control voltage developed which is applied to the varactor diodes increases the capacitance they exhibit and this reduces the frequency of the tuned circuit 14. The tuning continues until the tuned circuit frequency reduces to a value exactly double that of the frequency of the pulse B.

We claim:

1. A circuit for producing clock signals which are synchronous with binary signals comprising, in combination:

a source of signals of the type in which each change in signal level represents a binary digit, said source being subject to drift;

a tuned circuit tuned to frequency $nf$, where $n$ is some integer and $f$ is the nominal frequency of said signals representing binary digits;

pulse producing means coupled to said source for translating each change in signal level to a pulse of the same polarity;

means for applying said pulses to said tuned circuits;

clock signal producing means coupled to said tuned circuit for translating the oscillations produced thereby to a square wave and its complement;

means for comparing the phase of said square wave with that of said pulses for developing a first direct voltage level;

means for comparing the phase of the complement of said square wave with that of said pulses for developing a second direct voltage level; and means responsive to said first and second voltage levels for tuning said tuned circuit in a sense to make said two levels equal.

2. A circuit as set forth in claim 1, wherein said means for tuning said tuned circuit includes a pair of varactor diodes serving as electronically controllable impedance elements.

3. A circuit as set forth in claim 1, wherein the last-named means includes a differential amplifier having a pair of input signal terminals, a capacitor connected between these terminals, means for applying said first direct voltage level to one of said terminals, and means for applying said second direct voltage level to the other said terminal.

4. A circuit as set forth in claim 3, further including an electronically controllable impedance as one of the elements of said tuned circuit, and a low-pass filter connected between the output terminal of said differential amplifier and said electronically controllable impedance.